(No Model.)
G. W. TINSLEY.
HOSE COUPLING FOR STREET WASHERS.
No. 448,694. Patented Mar. 24, 1891.
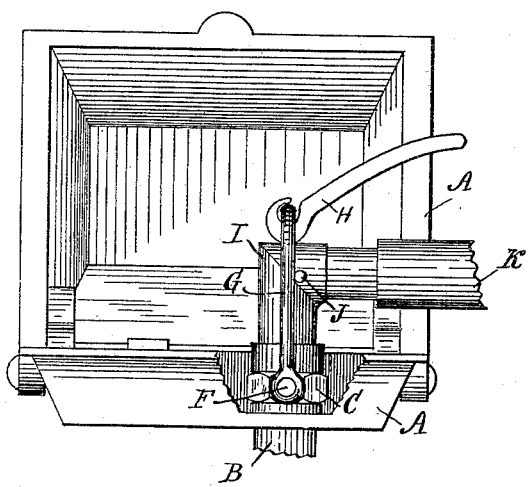
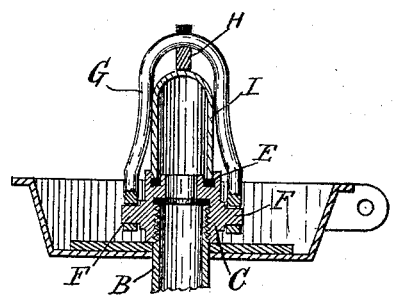
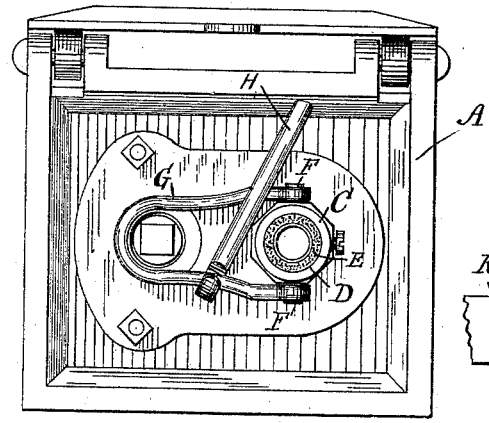
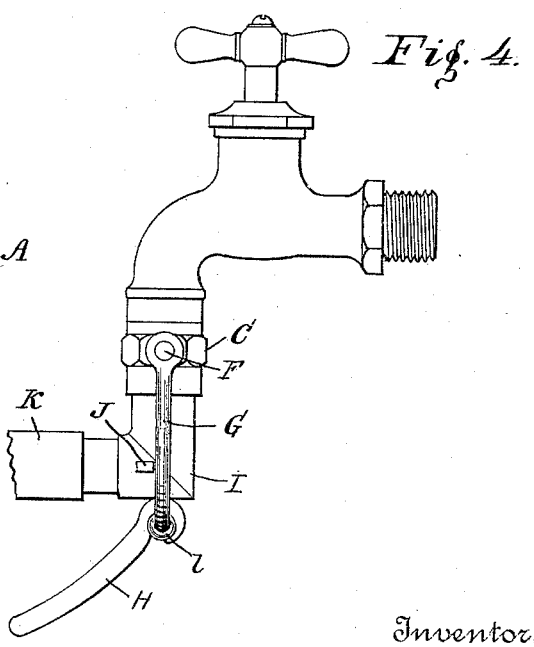
Witnesses
C. M. Hood.
A. M. Hood,
Inventor.
George W. Tinsley.
By His Attorney
H. P. Hood,

UNITED STATES PATENT OFFICE.

GEORGE W. TINSLEY, OF COLUMBUS, INDIANA.

HOSE-COUPLING FOR STREET-WASHERS.

SPECIFICATION forming part of Letters Patent No. 448,694, dated March 24, 1891.

Application filed July 30, 1890. Serial No. 360,382. (No model.)

*To all whom it may concern:*

Be it known that I, GEORGE W. TINSLEY, a citizen of the United States, residing at Columbus, in the county of Bartholomew and State of Indiana, have invented a new and useful Improvement in Hose-Couplings for Street-Washers, of which the following is a specification.

My invention relates to an improved coupling for connecting hose with a street-washer.

The object of my improvement is to provide a coupling which may be folded within the street-washer box when not in use, and which will accomplish the coupling of the hose to the water-supply pipe quickly and without any twisting of the hose.

The accompanying drawings illustrate my invention.

Figure 1 is a plan showing the coupling folded within the street-washer box and the hose removed. Fig. 2 is a side elevation showing the coupling and the hose in working position. Fig. 3 represents a transverse section at *a*, Fig. 2. Fig. 4 represents a side elevation of the coupling applied to a faucet.

A is the street-washer box of the usual well-known construction.

B is the water-supply pipe.

C is a tubular nut having in its under side a screw-threaded recess adapted to be screwed onto the water-supply pipe B, an annular recess D in its upper side, and an annular elastic washer E arranged in said recess. Projecting from two opposite sides of the nut C are a pair of trunnions F F, on which the ends of the yoke G are pivoted. A cam-lever H is mounted on yoke G, so as to turn or slide thereon, the arrangement being such that the yoke and lever may be folded down within the washer-box, as shown in Fig. 1, or raised to a vertical position, as shown in Fig. 2.

I is an ordinary pipe-elbow having on opposite sides projecting stop-lugs J. The hose K is secured to one arm of the pipe-elbow I, the other end of the elbow having been placed upon the annular washer E, the relation between the elbow, yoke G, and cam-lever H being such that when the yoke is raised to a vertical position it comes in contact with the stops J, and the cam-lever H being thrown forward to the position shown in Fig. 2 the elbow is securely clamped to the nut, thereby connecting the hose with the water-supply pipe.

In applying the coupling to a faucet, as in Fig. 5, the faucet is screw-threaded and takes the place of the water-supply pipe of the street-box, and the yoke is provided with a collar *l* on each side of the cam-lever, which prevents the cam-lever from sliding laterally on the yoke.

I claim as my invention—

1. The hose-coupling consisting of the hollow nut having in one side a screw-threaded recess and in the opposite side an annular recess, the annular elastic washer arranged in said recess, the yoke pivoted to said nut, the cam-lever mounted on said yoke, and the pipe-elbow, all combined and arranged to cooperate substantially as set forth.

2. In a hose-coupling for street-washers, the combination of the street-washer box, the water-supply pipe leading thereto, the hollow nut having in one side a screw-threaded recess adapted to fit the water-supply pipe, and an annular elastic washer embedded in the opposite side, the yoke pivoted to the nut and adapted to embrace a pipe-elbow, and the cam-lever mounted on the yoke, said yoke and cam-lever being arranged to fold within the box, substantially as set forth.

GEORGE W. TINSLEY.

Witnesses:
H. P. HOOD,
V. M. HOOD.